United States Patent
Rau et al.

(10) Patent No.: US 11,947,931 B2
(45) Date of Patent: Apr. 2, 2024

(54) GENERIC FACTORY CLASS

(71) Applicant: SAP SE, Walldorf (DE)

(72) Inventors: Stefan Rau, Dielheim (DE); Michael Haberkorn, Bad Schönborn (DE)

(73) Assignee: SAP SE, Walldorf (DE)

( * ) Notice: Subject to any disclaimer, the term of this patent is extended or adjusted under 35 U.S.C. 154(b) by 164 days.

(21) Appl. No.: 17/499,158

(22) Filed: Oct. 12, 2021

(65) Prior Publication Data
US 2023/0110270 A1    Apr. 13, 2023

(51) Int. Cl.
*G06F 8/20* (2018.01)
*G06F 8/30* (2018.01)
*G06F 8/41* (2018.01)

(52) U.S. Cl.
CPC .............. *G06F 8/24* (2013.01); *G06F 8/315* (2013.01); *G06F 8/42* (2013.01)

(58) Field of Classification Search
CPC ........................................................ G06F 8/24
USPC ........................................................ 717/108
See application file for complete search history.

(56) References Cited

U.S. PATENT DOCUMENTS

| | | | | |
|---|---|---|---|---|
| 7,316,002 B1 * | 1/2008 | Armand | .............. | G06F 9/4492 717/109 |
| 7,546,576 B2 * | 6/2009 | Egli | .............. | H04L 9/40 715/239 |
| 7,971,194 B1 * | 6/2011 | Gilboa | .............. | G06F 9/45512 717/136 |
| 8,001,523 B1 * | 8/2011 | Wiltamuth | .............. | G06F 8/36 717/114 |
| 8,527,943 B1 * | 9/2013 | Chiluvuri | .............. | G06F 8/36 717/111 |
| 8,612,964 B2 * | 12/2013 | Jalaldeen | .............. | G06F 8/35 717/168 |
| 8,881,122 B1 * | 11/2014 | Klimek | .............. | G06F 8/427 717/140 |
| 9,009,058 B2 * | 4/2015 | Erickson | .............. | G06F 8/34 705/1.1 |
| 9,026,989 B2 * | 5/2015 | Gall | .............. | G06F 9/4488 717/106 |
| 9,772,828 B2 * | 9/2017 | Goetz | .............. | G06F 8/437 |
| 10,324,690 B2 * | 6/2019 | Ouali | .............. | G06F 11/36 |
| 10,628,173 B1 * | 4/2020 | Hillyard | .............. | G06F 9/44521 |
| 10,740,115 B2 * | 8/2020 | Goetz | .............. | G06F 9/44521 |
| 11,609,753 B2 * | 3/2023 | Samuel | .............. | G06F 8/10 |

(Continued)

FOREIGN PATENT DOCUMENTS

| | | | | |
|---|---|---|---|---|
| CA | 2786095 A1 * | 9/2013 | .............. | G06F 8/65 |
| CN | 111752551 A * | 10/2020 | | |
| KR | 20080070337 A * | 7/2008 | | |

OTHER PUBLICATIONS

Foreign Patent Documents: Text Translations.*

*Primary Examiner* — Francisco J Aponte
(74) *Attorney, Agent, or Firm* — Buckley, Maschoff & Talwalkar LLC (57) ABSTRACT

Systems and methods provide a generic factory class to determine one or more classes implementing an interface and/or derived from a base class in response to a call from an application factory class by retrieving a list of the one or more classes implementing the interface or derived from the based class, determining properties of each of the one or more classes, and return, based on the properties, a name of each of one or more of the one or more classes.

18 Claims, 8 Drawing Sheets

(56) References Cited

U.S. PATENT DOCUMENTS

| | | | |
|---|---|---|---|
| 2006/0230379 A1* | 10/2006 | Pintos | G06F 8/38 |
| | | | 717/109 |
| 2008/0154950 A1* | 6/2008 | Gross | G06F 8/24 |
| 2014/0337816 A1* | 11/2014 | Chiluvuri | G06F 8/20 |
| | | | 717/107 |
| 2016/0004516 A1* | 1/2016 | Ivanov | G06F 8/34 |
| | | | 717/106 |
| 2016/0321021 A1* | 11/2016 | Derut | G06F 8/38 |
| 2017/0003938 A1* | 1/2017 | Gulkis | G06F 8/315 |
| 2020/0192639 A1* | 6/2020 | Rau | G06F 9/451 |
| 2020/0272438 A1* | 8/2020 | Klemenz | G06F 8/35 |
| 2020/0372038 A1* | 11/2020 | Feeney | G06F 16/21 |

* cited by examiner

| Constructor | |
|---|---|
| iv_interface_name | Name of the interface that is used by the calling framework |
| iv_base_class_name | Name of the class that acts as base class called by the calling framework |
| iv_use_only_interface_impl | If true, only the classes implementing the given interface directly will be part of the result set |
| iv_with_syntax_check | Execute syntax check or not |
| Other criteria | Future use |
| it_executable | Table for filter criteria to define whether class is executable |

*FIG. 3*

| Generic factory class |
|---|
| Constructor |
| get_executable_instance |
| get_executable_class_names |
| get_all_class_definitions |
| get_readable_class_names |
| get_class_name_for_read_name |

GENERIC FACTORY CLASS

BACKGROUND

Modern enterprise software applications provide many standard functions. For example, a purchasing application may provide pre-defined purchase order behavior and processes for completing, approving and tracking such purchase orders. Some applications allow customization of pre-defined data structures such as purchase orders for use in customer deployments. The customization may be performed, typically, by the developer of the application, a development partner of the application, or by the customer themselves.

Customization may further include customization of the application itself. This customization may include customization of existing classes. Customization of an existing class derived from a base class typically requires awareness of all classes derived from the base class. Similarly, customization of a class implementing a particular interface requires knowledge of all classes implementing the particular interface. Traditionally, these requirements are satisfied by a registration process by which the existence of the other classes is hard-code into the application-specific factory class.

Systems are therefore desired to efficiently incorporate a class created by a customer into an application without an explicit registration step. Such systems may facilitate identification of all classes derived from a particular base class, and of all classes implementing a specific interface and/or derived from a particular base class implementation.

DETAILED DESCRIPTION

The following description is provided to enable any person in the art to make and use the described embodiments. Various modifications, however, will remain readily-apparent to those in the art.

Some embodiments provide a generic factory class for implementation by application-specific factory classes. Such a generic factory class searches for and collects all derivations of a specified base class or a specified interface implementation. According to some embodiments, the generic factory class may perform an optional syntax check so as to identify unexecutable classes and prevent presentation thereof on a design-time user interface and at run-time.

Figure 1:
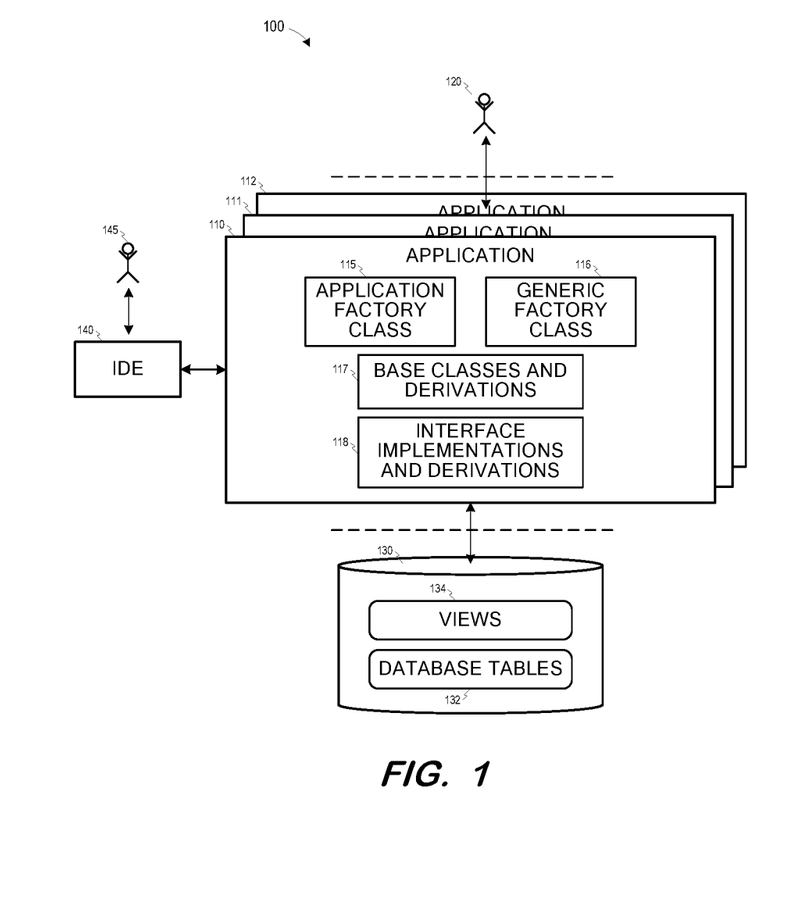
FIG. 1 illustrates an architecture to provide extensible applications according to some embodiments.

FIG. 1 is a block diagram of architecture 100 according to some embodiments. The illustrated elements of architecture 100 may be implemented using any suitable combination of computing hardware and/or software that is or becomes known. In some embodiments, two or more elements of architecture 100 are implemented by a single computing device. One or more elements of architecture 100 may be implemented as a cloud service (e.g., Software-as-a-Service, Platform-as-a-Service).

Architecture 100 includes applications 110, 111 and 112, each of which may be accessed by end-users such as end-user 120. End-user 120 may access applications 110, 111 and 112 via any suitable mechanisms. According to some embodiments, end-user 120 executes a Web browser to access a launchpad application provided by a Web service and which includes links for accessing individual ones of applications 110. Each of applications 110, 111 and 112 may also or alternatively by accessed directly using a respective access paradigm. Access to any of applications 110, 111 and 112 may require the submission of credentials, which may determine authorizations and access with which end-user 120 is associated.

Applications 110, 111 and 112 may provide functionality based on data stored in data store 130. Data store 130 persistently stores, for example, database tables 132 and metadata defining views 134 on database tables 132 as is known in the art. Data store 130 may comprise distributed and/or cloud-based storage, and one or more of applications 110, 111 and 112 may communicate with a dedicated data store (not shown).

The data stored within data store 130 may comprise one or more of conventional tabular data, row-based data, column-based data, and object-based data. The data may be distributed among several relational databases, dimensional databases, and/or other data sources. Moreover, the data may be indexed and/or selectively replicated in an index to allow fast searching and retrieval thereof.

Data store 130 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As shown with respect to application 110, an application of system 100 includes application factory class 115 as is known in the art. Application factory class 115 instantiates, at run-time, the classes required for execution of application 110. According to some embodiments, such instantiation is performed via generic factory class 116 which identifies the specific derivations of various base classes 117 and/or of various interface implementations 118 which should be instantiated.

The determination of derivations initially occurs at start-up of the application. As shown, developer 145 operates integrated development environment (IDE) 140 at design-time to create or modify code of applications 110, 111 or 112. IDE 140 may comprise an on-premise, or cloud-based application as is known in the art.

As is also known in the art, IDE 140 calls application factory class 115 to determine derivations of base classes and interface implementations. In contrast to systems requiring registration or other hard-coding of such derivations, application factory class 115 accesses generic factory class 116 to identify such derivations and acquire technical names thereof for use during run-time. Developer 145 may then operate IDE 140 to select desired derivations for use.

Figure 2:
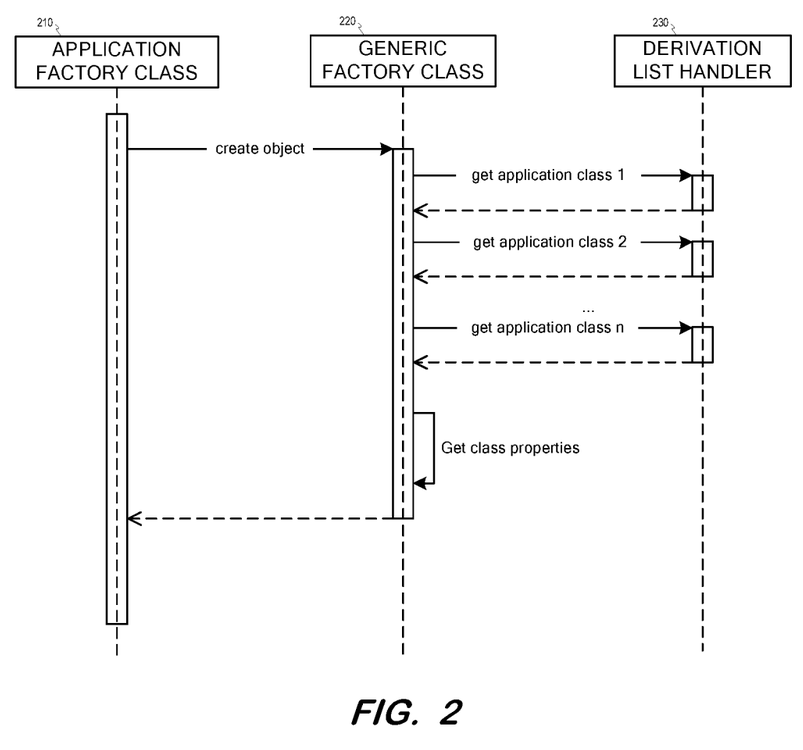
FIG. 2 is a sequence diagram of a design-time process to identify derived classes or interface implementations according to some embodiments.

FIG. 2 is a sequence diagram of a start-up process, typically at design time, to identify derived classes or interface implementations according to some embodiments. All processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Application factory class 210 may comprise a factory class associated with any given application as is known in the art. As noted above, application factory class 210 may be called at design-time to identify class and interface derivations.

In response to such a request, application factory class 210 calls the constructor method of generic factory class 220 with an identifier of the base class or interface for which derivations are to be identified. In the present example, the method is create object and is called with a name of a base class or an interface whose derivations are to be identified.

In response to the call from application factory 210, generic factory class 220 searches for all classes implementing a given interface and/or all classes deriving from these classes (in a case that an interface name is passed with the call from application factory class 210), and/or all classes deriving from given base class (in a case that a base class name is passed with the call from application factory class 210).

The search comprises retrieving all available classes 1-*n* from derivation list handler 230. In the case of an ABAP runtime, derivation list 230 is implemented by an OO handler, but embodiments may be implemented in other technology platforms which provide similar functionality, including but not limited to java and .net. After the classes are retrieved, generic factory class 220 may perform a determination of properties of the retrieved classes. The determination may depend upon a status of a flag received in the original call to the constructor of generic factory class 220 from application factory class 210.

The determined properties may include a technical name of the class, a readable name of the class, a flag indicating whether or not the class is executable, and a flag indicating whether the class includes a syntax error, as determined by generic factory class 220. According to some embodiments, generic factory class 220 performs a syntax check on a class by initiating compilation of the class and determining whether the compilation is successful.

Figure 3:
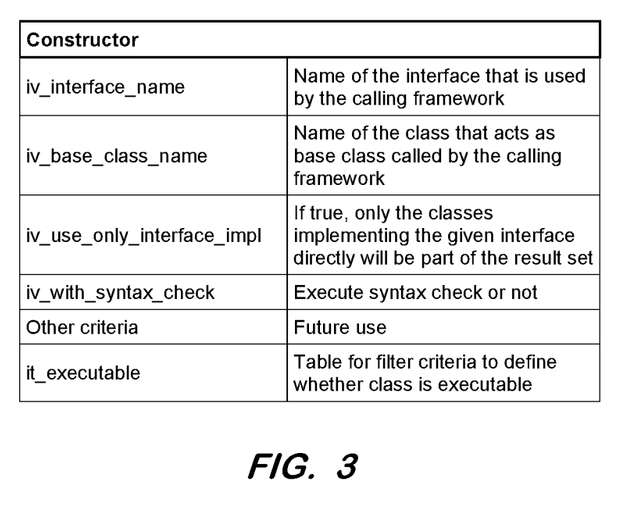
FIG. 3 is a table describing input parameters of a generic factory class constructor according to some embodiments.

FIG. 3 is a table describing input parameters of a generic factory class constructor according to some embodiments. As mentioned above, only one of parameters iv_interface_name and iv_base_class_name is to be passed in a given call. Parameter iv_use_only_interface_impl is a flag which may be used if parameter iv_interface_name is passed, which indicates whether only classes implementing the interface directly should be returned or whether derivations thereof should also be returned. Flag iv_with_syntax_check indicates whether generic factory class 220 should perform a syntax check on all returned classes. The flag may be set during design-time calls to the constructor to avoid presentation of unexecutable classes to a user of the development environment in FIG. 6.

Figure 4:
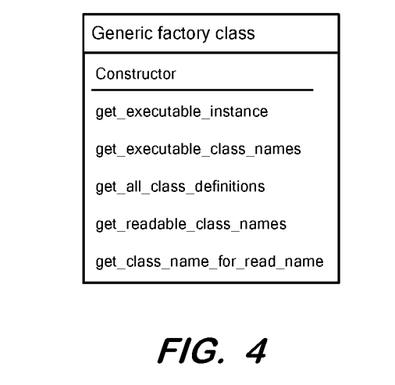
FIG. 4 illustrates methods of a generic factory class according to some embodiments.

FIG. 4 illustrates the constructor and methods of generic factory class 220 according to some embodiments. Generally, the method get_executable_instance is called at run-time and returns an instance of one determined derivation addressed by a key. The method get_executable_instance will be described in detail below with respect to FIG. 8.

The method get_executable class names returns a list of the technical names or keys of all determined classes that are executable (i.e., not abstract and not including a syntax error), while the method get_readable_class_names returns a list of readable (i.e., user interface-friendly) class names of all determined classes that are executable. In contrast, the method get_all_class_definitions returns a list of class names or keys of all determined classes, including those which are not executable, along with corresponding class definitions including class properties such as those described above. Finally, the method get_class_name_for_read_name returns the technical class name corresponding to a given readable name. Embodiments of a generic factory class are not limited to the methods, nor require each of the methods, described above.

Figure 5:
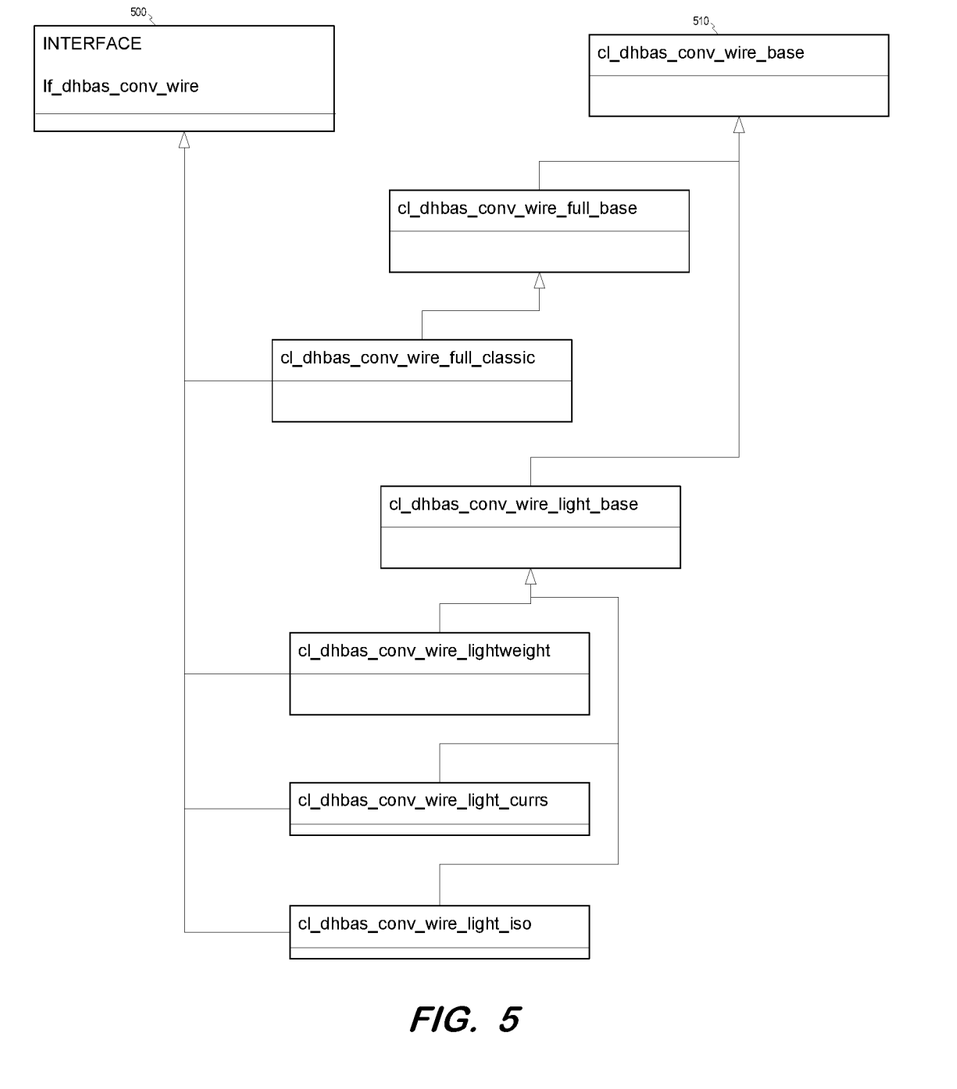
FIG. 5 is a unified modeling language (UML) diagram according to some embodiments.

FIG. 5 is a UML diagram associated with example interface 500 according to some embodiments. The interface provides a set of different data type conversions for a use case. During design-time, a developer may operate a development environment to access derivations of base class 510 implementing interface 500.

Figure 6:
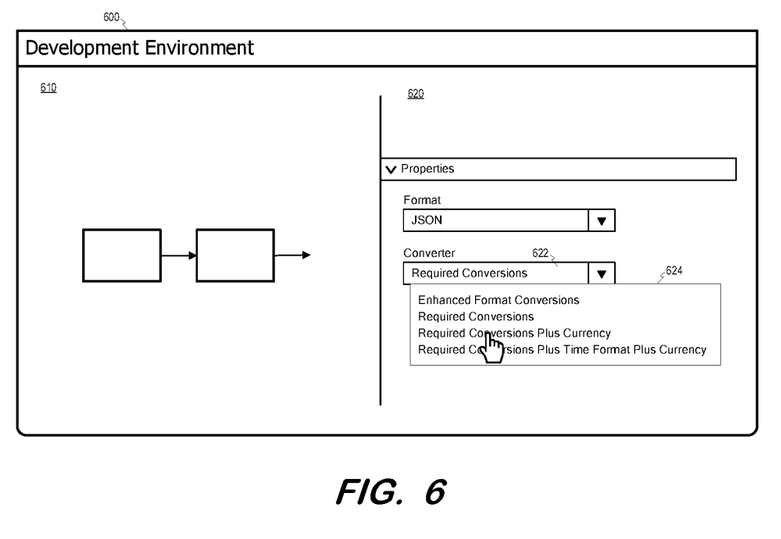
FIG. 6 is a view of a user interface of a development environment according to some embodiments.

FIG. 6 is a view of user interface 600 of a development environment according to some embodiments. User interface 600 includes workspace 610 for visualizing and editing software components and configuration user interface 620. Dropdown menu 622 allows a developer to select a particular converter to be used to implement the associated interface. Specifically, upon selecting menu 622, the developer is presented with list 624 presenting the readable names of all classes implementing the same interface.

The readable names of list 624 may be acquired by a corresponding application factory class 210 using generic factory class 220 as described above with respect to FIG. 2. If the flag iv_with_syntax_check was set in the initial call to generic factory class 220, the returned readable names are associated with executable classes and omit classes which are determined by generic factory class 220 to exhibit a syntax error.

Figure 7:
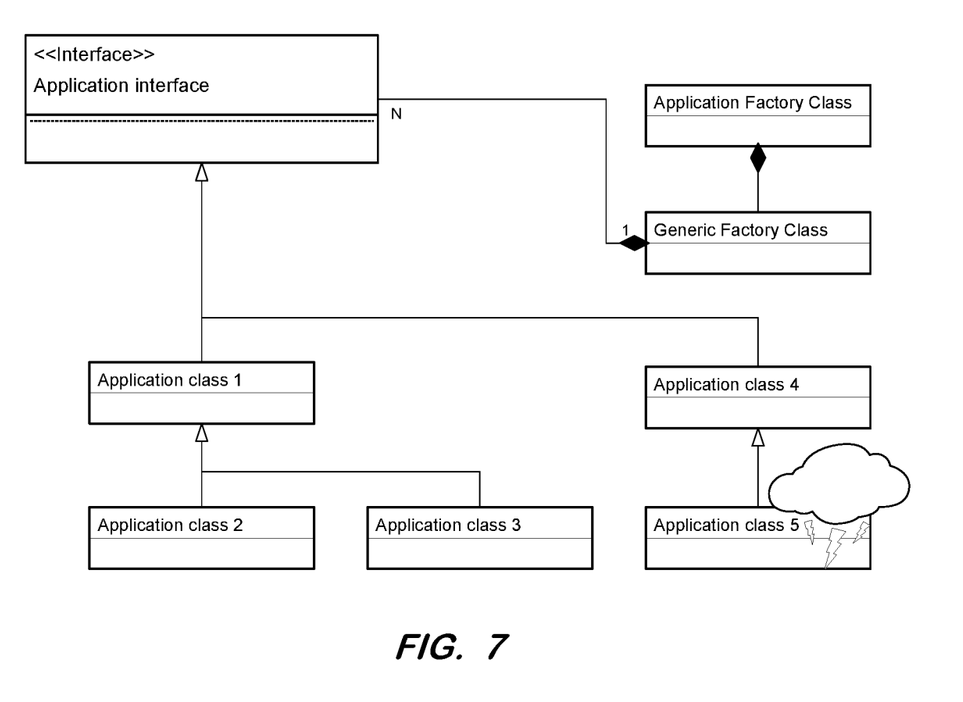
FIG. 7 is a UML diagram according to some embodiments.

FIG. 7 is a UML diagram depicting a factory class of an application and an interface which is implemented by this application. Application class 1 is assumed to be an abstract class implementing the interface and allows instantiation of instances of Application class 2 and Application class 3 by the generic factory class when required. Application class 4 is implemented as an executable class and Application class 5 derives from Application class 4 and contains a syntax error.

In one example, the generic factory class is created by calling its constructor with flag iv_use_only_interface_implementers=false. A subsequent call to get_executable class names returns Application class 2, Application class 3 and Application class 4, because neither Application class 1 (i.e., an abstract class) nor Application class 5 (i.e., a class including a syntax error) are executable.

In another example, the generic factory class is created by calling its constructor with flag iv_use_only_interface_implementers=true. Accordingly, a subsequent call to get_executable class names returns only Application class 4, as only Application class directly implements the interface and is executable.

Figure 8:
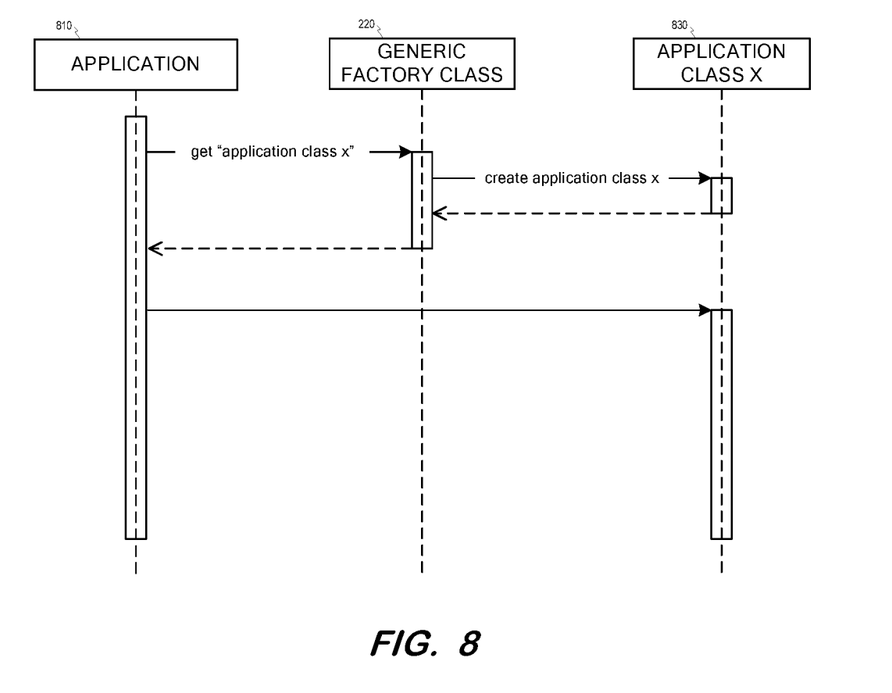
FIG. 8 is a sequence diagram of a run-time process to identify derived classes or interface implementations according to some embodiments.

FIG. 8 is a sequence diagram of a run-time process to identify derived classes or interface implementations according to some embodiments. At runtime, application 810 calls a method of generic factory class 220 (e.g., get_executable_instance) to create a runtime instance of a class (i.e., application class X 830) selected from a list as described above. Generic factory class 220 may use standard object-oriented instantiation mechanisms to instantiate application class X 830. In some embodiments, application 810 transfers optional parameters from the application to generic factory class 220, which are in turn routed to the constructor of application class X 830.

Generic factory class 220 returns a reference to the instantiated object to application 810. Application 810 may then use object directly without further use of generic factory class 220.

Figure 9:
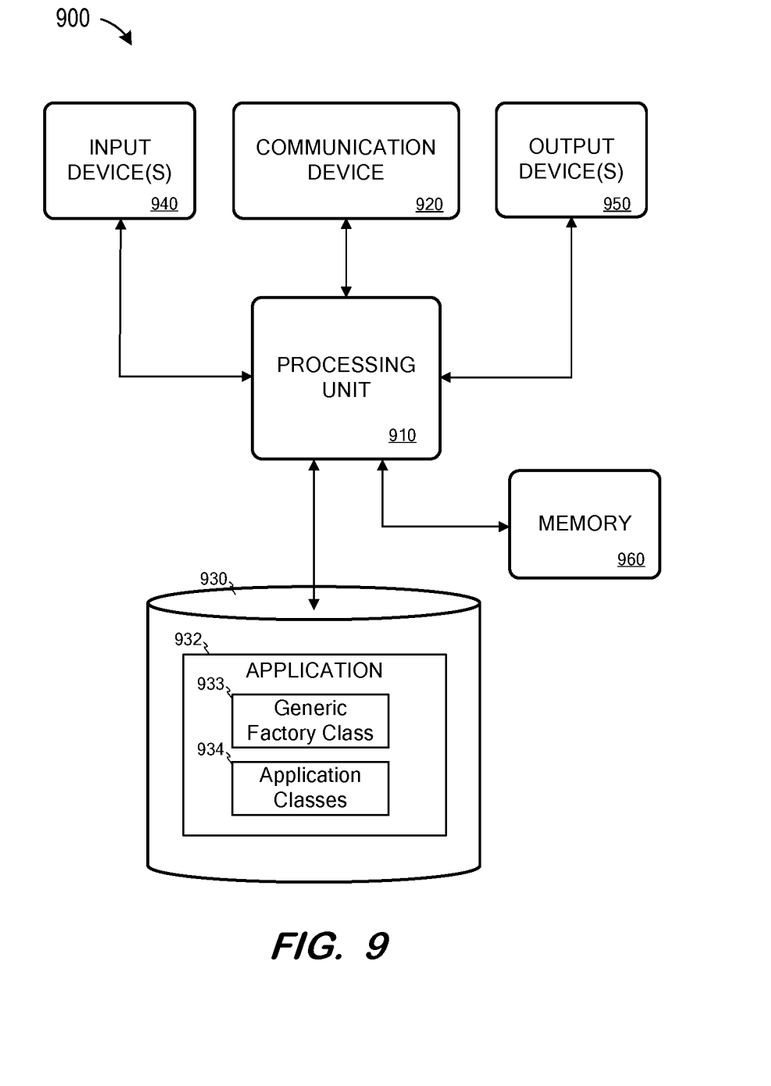
FIG. 9 is a block diagram of a hardware system according to some embodiments.

FIG. 9 is a block diagram of apparatus 900 according to some embodiments. Apparatus 900 may comprise a general-purpose computing apparatus and may execute program code to perform any of the functions described herein. Apparatus 900 may include other unshown elements according to some embodiments.

Apparatus 900 includes processing unit 910 operatively coupled to communication device 920, data storage device 930, one or more input devices 940, one or more output devices 950 and memory 960. Communication device 920 may comprise a network card for communication with external networks. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen), a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory. As shown, data storage device 930 may store executable program code of application 932 including generic factory class 933 and application classes 934 as described herein. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code;
a processing unit to execute the processor-executable program code to cause the system to:
determine an interface;
receive a call from an integrated development environment to execute an instantiation of an application factory to call a constructor to instantiate an instantiation of a generic factory class, the generic factory class to determine one or more classes implementing the interface during run-time;
during run-time, execute the instantiation of the generic factory class to retrieve a list of the one or more classes implementing the interface;
during run-time, execute the instantiation of the generic factory class to determine properties of each of the one or more classes;
during run-time, execute the instantiation of the generic factory class to return, based on the properties, a name of each of one or more of the one or more classes; and
receive a selection from the integrated development environment of one or more of the returned names of each of one or more of the one or more classes.

2. A system according to claim 1, wherein execution of the instantiation of the generic factory class to return, based on the properties, a name of each of one or more of the one or more classes comprises:
for each class of the list of one or more classes, determining whether the class includes a syntax error,
wherein each of the one or more classes for which a name is returned is determined to not include a syntax error.

3. A system according to claim 2, wherein the call to the constructor includes a flag comprising an instruction to perform syntax checks of the one or more classes of the retrieved list.

4. A system according to claim 1, wherein each of the one or more classes for which a name is returned is an executable class.

5. A system according to claim 1, wherein the one or more classes for which a name is returned include at least one derived class of a class which directly implements the interface.

6. A system according to claim 1, wherein the one or more classes for which a name is returned include only classes which directly implement the interface.

7. A system according to claim 6, wherein the call to the constructor includes a flag comprising an instruction to return names of only classes which directly implement the interface.

8. A non-transitory computer-readable medium storing processor-executable program code executable by a computing system to:
   determine an interface;
   receive a call from an integrated development environment to execute an instantiation of an application factory to call a constructor to instantiate an instantiation of a generic factory class, the generic factory class to determine one or more classes implementing the interface;
   during run-time, execute the instantiation of the generic factory class to retrieve a list of the one or more classes implementing the interface;
   during run-time, execute the instantiation of the generic factory class to determine properties of each of the one or more classes;
   during run-time, execute the instantiation of the generic factory class to return, based on the properties, a name of each of one or more of the one or more classes; and
   receive a selection from the integrated development environment of one or more of the returned names of each of one or more of the one or more classes.

9. A medium according to claim 8, wherein execution of the instantiation of the generic factory class to return, based on the properties, a name of each of one or more of the one or more classes comprises:
   for each class of the list of one or more classes, determining whether the class includes a syntax error,
   wherein each of the one or more classes for which a name is returned is determined to not include a syntax error.

10. A medium according to claim 9, wherein the call to the constructor includes a flag comprising an instruction to perform syntax checks of the one or more classes of the retrieved list.

11. A medium according to claim 8, wherein each of the one or more classes for which a name is returned is an executable class.

12. A medium according to claim 8, wherein the one or more classes for which a name is returned include at least one derived class of a class which directly implements the interface.

13. A medium according to claim 8, wherein the one or more classes for which a name is returned include only classes which directly implement the interface.

14. A medium according to claim 13, wherein the call to the constructor includes a flag comprising an instruction to return names of only classes which directly implement the interface.

15. A computer-implemented method comprising:
   determining a base class;
   receiving a call from an integrated development environment to execute an instantiation of an application factory to call a constructor to instantiate an instantiation of a generic factory class, the generic factory class to determine one or more classes derived from the base class;
   during run-time, executing the instantiation of the generic factory class to retrieve a list of the one or more classes derived from the base class;
   during run-time, executing the instantiation of the generic factory class to determine properties of each of the one or more classes;
   during run-time, executing the instantiation of the generic factory class to return, based on the properties, a name of each of one or more of the one or more classes; and
   receiving a selection from the integrated development environment of one or more of the returned names of each of one or more of the one or more classes.

16. A method according to claim 15, wherein executing of the instantiation of the generic factory class to return, based on the properties, a name of each of one or more of the one or more classes comprises:
   for each class of the list of one or more classes, determining whether the class includes a syntax error,
   wherein each of the one or more classes for which a name is returned is determined to not include a syntax error.

17. A method according to claim 16, wherein the call to the constructor includes a flag comprising an instruction to perform syntax checks of the one or more classes of the retrieved list.

18. A method according to claim 15, wherein each of the one or more classes for which a name is returned is an executable class.

* * * * *